Figure 1:
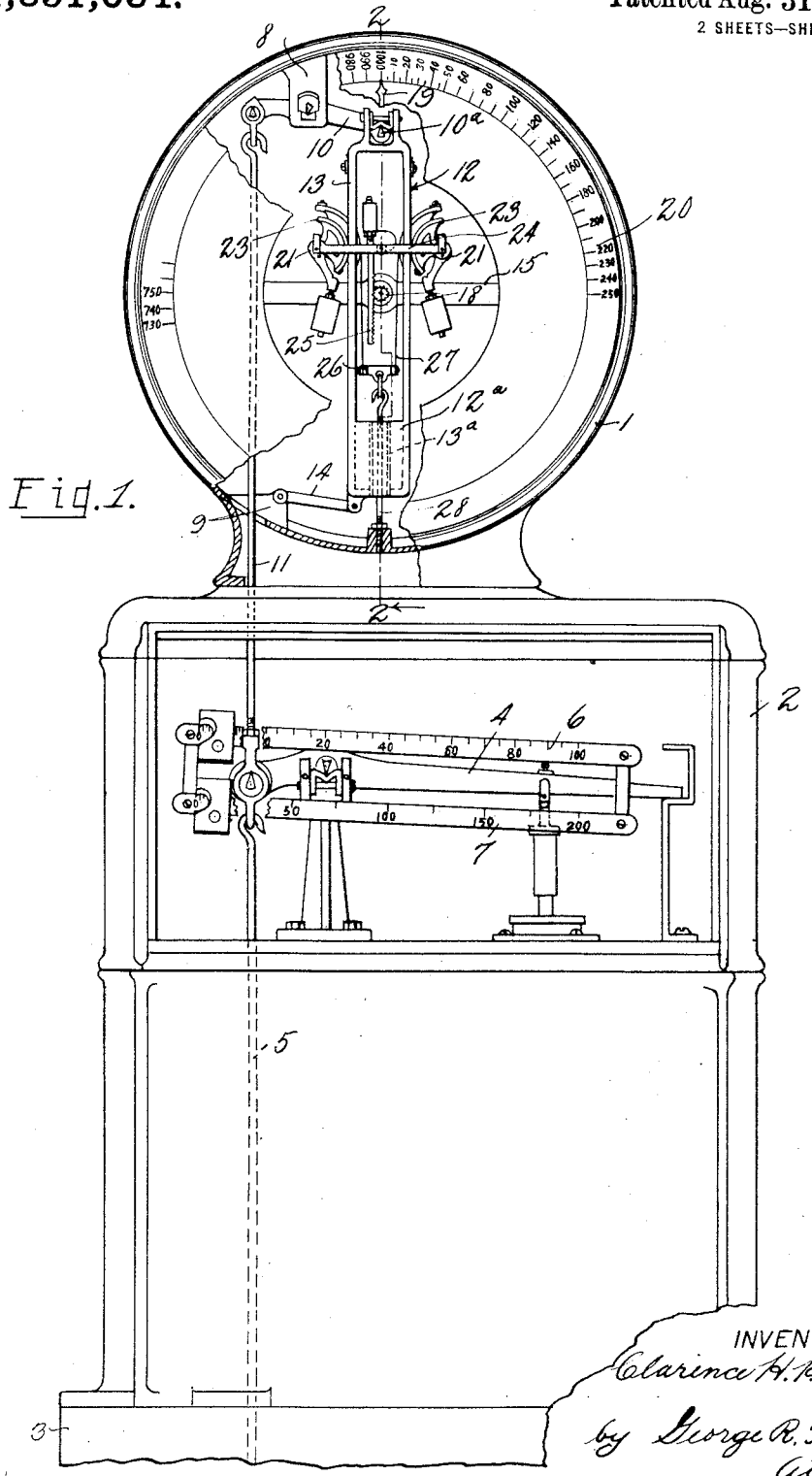

C. H. HAPGOOD.
WEIGHING SCALE.
APPLICATION FILED OCT. 23, 1916.

1,351,034.

Patented Aug. 31, 1920.
2 SHEETS—SHEET 1.

INVENTOR.
Clarence H. Hapgood
by George R. Frye
Atty

C. H. HAPGOOD.
WEIGHING SCALE.
APPLICATION FILED OCT. 23, 1916.

1,351,034.

Patented Aug. 31, 1920.
2 SHEETS—SHEET 2.

INVENTOR.
Clarence H. Hapgood
by George R. Frye
Atty.

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING-SCALE.

1,351,034.	Specification of Letters Patent.	Patented Aug. 31, 1920.

Application filed October 23, 1916. Serial No. 127,283.

*To all whom it may concern:*

Be it known that I, CLARENCE H. HAPGOOD, a citizen of the United States, residing at Toledo, in the county of Lucas and State of Ohio, have invented certain new and useful Improvements in Weighing-Scales, of which the following is a specification.

This invention relates to weighing scales, and more particularly to the weighing mechanism thereof.

My invention is applicable to many different kinds of scales, but is specially adapted and shown applied to pendulum scales designed to weigh comparatively heavy loads.

The primary object of my invention is to provide a construction that is an improvement over existing scales of this type by increasing the accuracy of weighing and indication and diminishing the liability of error.

A further object of my invention is to provide a pair of oppositely-disposed pendulums supported within the scale housing by means of a movable frame so arranged and connected as to cause the pendulums to swing outwardly to offset the weight of a commodity placed upon the scale platform.

With these and other objects in view which will appear as the description progresses, my invention resides in the construction, combination and arrangement of parts more fully described in the following specification and pointed out in the appended claims.

Referring to the drawings wherein is shown preferred embodiments of my invention:—

Figure 2:
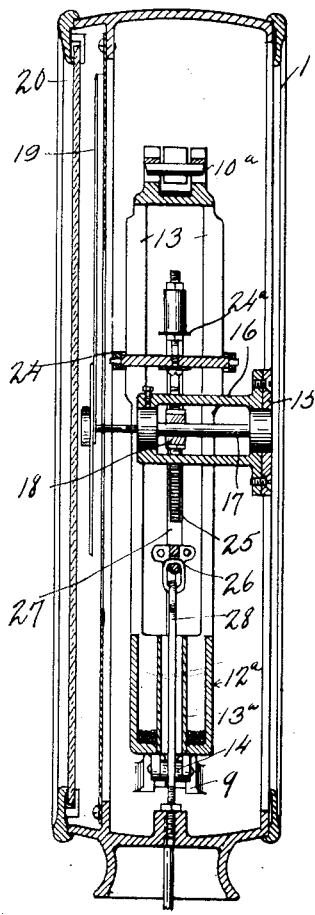
Figure 3:
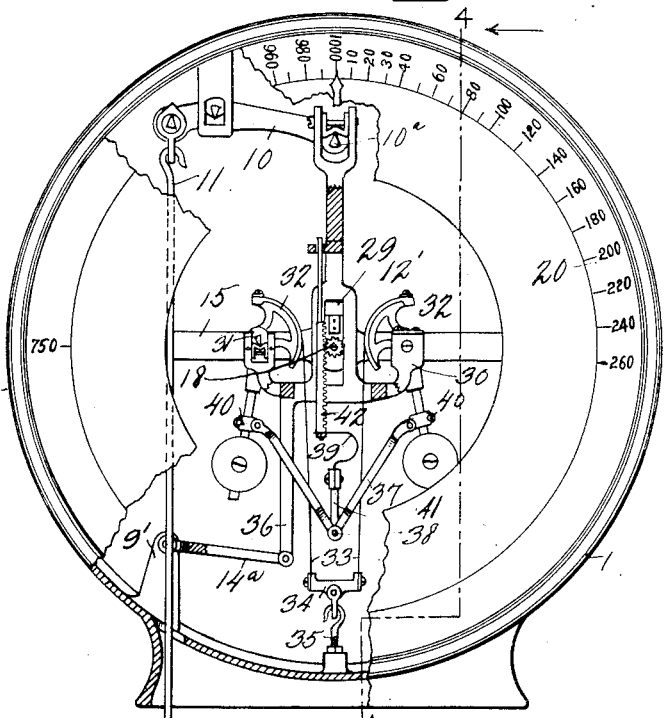
Figure 5:
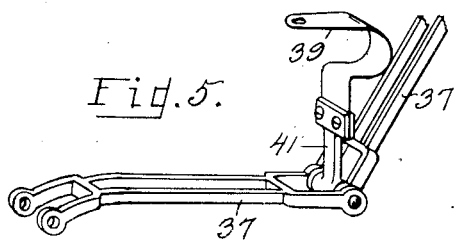
Figure 4:
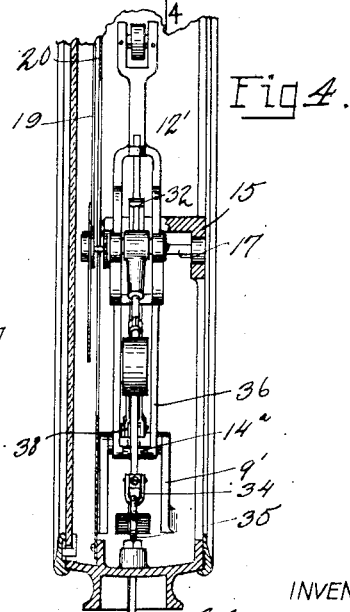

Figure 1 is a front elevation, partly in section, of the upper portion of a scale equipped with my improved weighing mechanism; Fig. 2 is a vertical section on the line 2—2 of Fig. 1; Fig. 3 is an enlarged front elevation of a slightly modified form of my device; Fig. 4 is a vertical section on the line 4—4 of Fig. 3; and Fig. 5 is a detail perspective view of a portion of the connecting links for driving the indicating means from the pendulum mechanism.

Referring first to the construction illustrated in Figs. 1 and 2, 1 designates a housing inclosing the weighing mechanism of the scale, supported upon a suitable cabinet or standard 2 adapted to rest upon the base 3 inclosing the usual platform levers (not shown). A main lever 4 connected with the platform levers by means of a lower steelyard 5 is fulcrumed within the standard 2 and carries tare and increased capacity beams 6 and 7 respectively of any familiar type. Within the housing 1 are formed at suitable points an upper bearing bracket 8 and a lower bracket 9, the upper bracket 8 having fulcrumed therein an auxiliary lever 10, having one arm connected with an upper steelyard 11 which establishes an operative connection between the main lever 4 and the auxiliary lever 10. Supported from the other arm of the lever 10 by means of knife-edge pivots $10^a$ and vertically disposed within the housing 1 is a movable frame 12 comprising substantially four pillars 13 connected together at their upper and lower extremities. The lower extremity of the frame 12 is preferably formed as a shot box $12^a$ with an annular tubing $13^a$ therein and is connected to the bracket 9 by means of a link 14 of the same effective length as and disposed parallel with respect to the arm of the lever 10 to which the frame 12 is connected to retain the frame 12 in a true vertical position during its entire movement.

A crossbar 15 is secured to the rear of the housing 1 and carries a horizontally-disposed bearing 16 supporting a shaft 17 having keyed thereto a pinion 18. An index hand 19 is also secured upon the outer end of the shaft 17 and is adapted to indicate the various weights of commodities in connection with the indicating chart 20.

A pair of oppositely-disposed pendulums 21 are suspended from the pillars 13 of the frame, flexible metallic ribbons being fastened at their upper ends to the pillars and at their lower extremities to the supporting segments 23 of the pendulum, being thus interposed between the segments and the pillars at every position of the former. Each pair of segments 23 is mounted upon the same cross shafts and the pendulum stems carrying the adjustable pendulum weights thereon are likewise supported upon the cross shafts. The cross shafts of the pendulums 21 are connected together by means of a horizontally-disposed yoke 24 which carries the rack bar 25 meshing with the pinion 18 through the medium of the resilient connecting link $24^a$. An equalizer bar 26 is flexibly connected to the larger segments 22 interposed between each pair of supporting segments 23 by means of metallic ribbons 27 passing over the arcuate faces of the segments, and is fixedly connected to the housing 1 by means of an adjustable hook rod 28 passing through the tubing 13ª in the frame 12.

In the operation of my improved weighing mechanism, when a commodity is placed upon the platform of the scale movement is imparted to the main lever 4 through the lower steelyard 5 connected to the platform levers, thereby rocking the lever 10 through the upper steelyard 11. The rocking of this lever 10 will move the frame 12 upwardly, and as the pendulums are suspended upon the frame 12 and also connected with the housing 1 by means of ribbons secured to the larger segments 22 and the equalizer bar 26, it will be apparent that as the frame moves upwardly carrying the pendulums therewith the ribbons 27 will cause the segments 22 to swing inwardly, swinging the pendulums outwardly and upwardly to positions offsetting the weight of the load upon the scale platform.

The yoke 24 and rack bar 25 are carried upwardly by both the movable frame and the outwardly swinging pendulums so that the vertical distance traversed by the rack rod is equal to the combined movement of the frame and pendulums. This permits the use of a pinion of increased diameter, thereby reducing the multiplication between the pinion and the indicator hand in accordance with the best scale practice.

In Figs. 3, 4 and 5 of the drawings is shown a slightly modified form of my invention. The frame 12' is of a different contour and may not be provided with the shot-box shown in the base of the frame 12. The frame 12' is provided centrally with an elongated opening 29, the walls of which surround the shaft 17, carrying the pinion 18 and index hand 19. From this central portion of the frame 12' extend lateral upturned arms 30 forming bearings for the pendulum pivots 31. The pendulums used in this form of device have fixed fulcrum pivots and are each provided with but one segment 32, to the upper end of which is fastened a ribbon 33 connected at its lower extremity to an equalizer bar 34 fixedly connected to the housing 1 by means of an adjustable hook rod 35. The frame is further provided with downwardly-projecting legs 36 to the lower ends of which is pivoted a link 14ª similar in all respects to the link 14 and connected to a bracket 9' in parallel relation to the auxiliary lever 10. The pendulum stems each carry collars 40 having pivotally connected thereto the outer ends of toggle levers 37, the inner ends of which are pivotally connected together, as at 38. At their junction, the toggle levers are connected with a vertically-disposed support 41 to which is secured a resilient connection 39 carrying the rack bar 42 meshing with the pinion 18.

In the operation of this form of my device, a downward pull exerted upon the steelyard 11 will cause the auxiliary lever to lift the frame 12' carrying with it the pendulum pivots. The segments 32, however, being fixedly connected with the housing 1, will not partake entirely of this upward movement of the frame but will swing inwardly, causing the pendulum weights to swing outwardly as previously described. As the pendulum stems swing outwardly the toggle levers tend to straighten and the rack bar 42 is raised, thereby operating the indicating mechanism of the scale.

While it will be apparent that the illustrated embodiments of my invention herein disclosed are well calculated to adequately fulfil the objects primarily stated, it is to be understood that the invention is susceptible to modification, variation and change without departing from the spirit and scope of the invention as set forth in the subjoined claims.

Having described my invention, I claim:

1. In a weighing scale and in combination with the indicating mechanism thereof, a vertically movable frame, oppositely-disposed pendulums carried by said frame and adapted to be rocked upon movement of the frame, means adapted to retain said frame in a true vertical position during its entire movement, and means carried by said pendulums for actuating the indicating mechanism.

2. In a weighing scale and in combination with the indicating mechanism thereof, a vertically-movable frame, pendulums carried by said frame, connections from the pendulums to a fixed portion of the scale, whereby the pendulums are rocked upon movement of the frame, supports secured to the frame adjacent its opposite ends for retaining the frame in a true vertical position during its entire movement, and means carried by said pendulums for actuating the indicating mechanism.

3. In a weighing scale and in combination with the indicating mechanism thereof, a vertically-movable frame, pendulums carried by said frame, connections from the pendulums to a fixed portion of the scale, whereby the pendulums are rocked upon movement of the frame, a support for the upper end of the frame, connections therefrom to the scale platform, check links secured adjacent the opposite end of the frame for retaining the frame in a true vertical position during its entire movement, and means carried by said pendulums for actuating the indicating mechanism.

4. In a weighing scale, weighing mechanism comprising a vertically movable frame, oppositely-disposed pendulums supported by said frame, segments carried by said pendulums and adapted to roll upon said frame, larger segments carried by the pendulums adjacent said first-named segments and fixedly connected to the scale, and means whereby the movement of said frame will swing the pendulums outwardly and upwardly on said frame.

5. In a weighing scale and in combination with the indicating mechanism thereof, weighing mechanism comprising a vertically-movable frame, pendulums mounted to roll upon said frame and fixedly connected to said scale, and means controlled by the movements of said pendulums for actuating the indicating mechanism of the scale and movable vertically a distance equal to the combined movement of the frame and pendulums.

6. In a weighing scale and in combination with the indicating mechanism thereof, weighing mechanism comprising a vertically movable frame, means for retaining said frame in a vertical position during its entire movement, pendulums supported upon said frame, and means controlled by the movements of said pendulums for actuating the indicating mechanism of the scale.

7. In a weighing scale and in combination with the indicating mechanism thereof, a vertically movable frame, oppositely-disposed pendulums supported by said frame and adapted to move therewith, means secured to one arm of each of said pendulums for swinging the other arms thereof outwardly as the frame moves upwardly, and means resiliently connected to said pendulums for actuating said indicating mechanism and movable vertically a distance equal to the combined movement of the frame and pendulums.

8. In a weighing scale and in combination with the indicating mechanism thereof, a vertically-movable frame, a support for the upper end of the frame, connections from the support to the scale platform, oppositely-disposed pendulums secured to and adapted to roll upon the frame, connections from the pendulums to a fixed portion of the scale, and means controlled by the movement of the pendulums for actuating the indicating mechanism.

9. In a weighing scale and in combination with the indicating mechanism thereof, a vertically-movable frame, a lever supporting the upper end of the frame, connections from the lever to the scale platform, oppositely-disposed pendulums secured to and adapted to roll upon the frame, connections from the pendulums to a fixed portion of the scale, and means controlled by the movement of the pendulums for actuating the indicating mechanism.

10. In a weighing scale and in combination with the indicating mechanism thereof, a vertically-movable frame, means for elevating the frame when a commodity is being weighed, a pair of load-offsetting pendulums secured to and adapted to roll upon the pendulums, connections from the pendulums to a fixed portion of the scale, and a rack rod connecting the pendulums with the indicating mechanism and arranged to move vertically a distance equal to the combined movement of the frame and pendulums.

CLARENCE H. HAPGOOD.

Witnesses:
GEORGE R. FRYE,
C. F. MILLER, Jr.